March 18, 1947.  P. F. RATCLIFF  2,417,614
PASTRY GLAZING MACHINE
Filed Oct. 28, 1944  3 Sheets-Sheet 1

Inventor
Peary F. Ratcliff
By A. F. Flournoy, Attorney

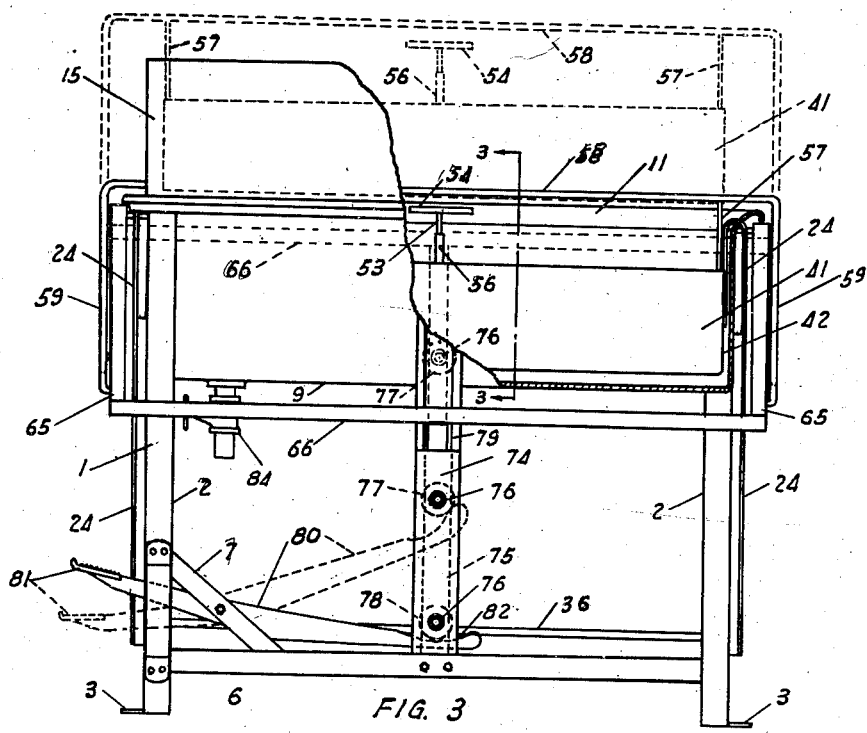

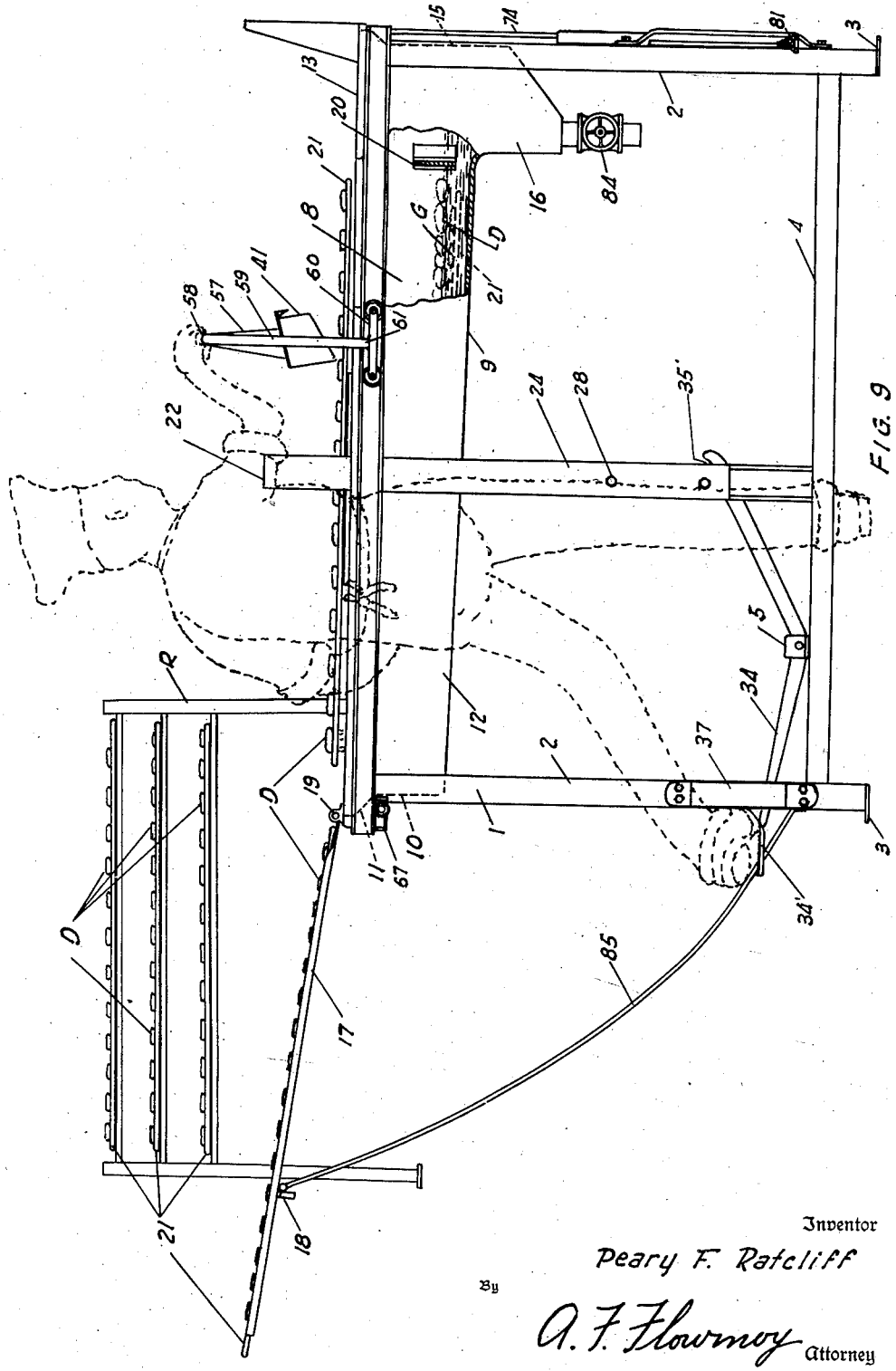

Patented Mar. 18, 1947

2,417,614

UNITED STATES PATENT OFFICE 2,417,614

PASTRY GLAZING MACHINE

Peary F. Ratcliff, Shreveport, La.

Application October 28, 1944, Serial No. 560,851

10 Claims. (Cl. 91—2)

My invention relates to pastry glazing equipment, but more especially to doughnut glazing machines.

An object of my invention is to provide a doughnut glazing machine with a glazing syrup reservoir and drain surfaces communicating with it arranged to catch glaze drippings from glazed pastry and conduct the same back into the reservoir.

Another object of my invention is to provide a manually operable doughnut glazing machine that embodies a glazing syrup distributing device that includes means for controlling the flow of glaze in which the operator with one hand may move the distributor over the pastry being glazed and control the rate of flow of the glazing syrup with the same hand he uses for moving the glazing syrup distributor.

Another object of my invention is to provide a pastry glazing machine with a glazing syrup distributor arranged to travel over a tray of pastry to be glazed.

Another object of my invention is to provide a pastry glazing machine with a manually operable glazing syrup distributor and a pastry tray lifting means adapted to be operated by the foot of the operator to lift a tray of glazed pastry into a position to be handled by the hands of the operator.

Other objects and advantages of my invention will appear in my detailed description to follow of a pastry glazing machine embodying my invention which is illustrated in my accompanying drawings.

Referring to the drawings:

Figure 3 is a partially broken end elevation view of the glazing machine illustrated in Figure 1.

Figure 4 is a vertical cross section view of a portion of the glazing machine taken on line 3—3 of Figure 3.

Figure 5 is a fragmentary elevation view of a portion of the glazing machine.

Figure 6 is a fragmentary elevation view of a portion of the glazing machine.

Figure 7 is a fragmentary elevation view of a portion of the glazing machine.

Figure 8 is a cross section elevation view taken on line 2—2 of Figure 1 of a portion of the glazing machine, and Figure 9 is a side elevation view, partly broken, of the glazing machine.

Figure 1:
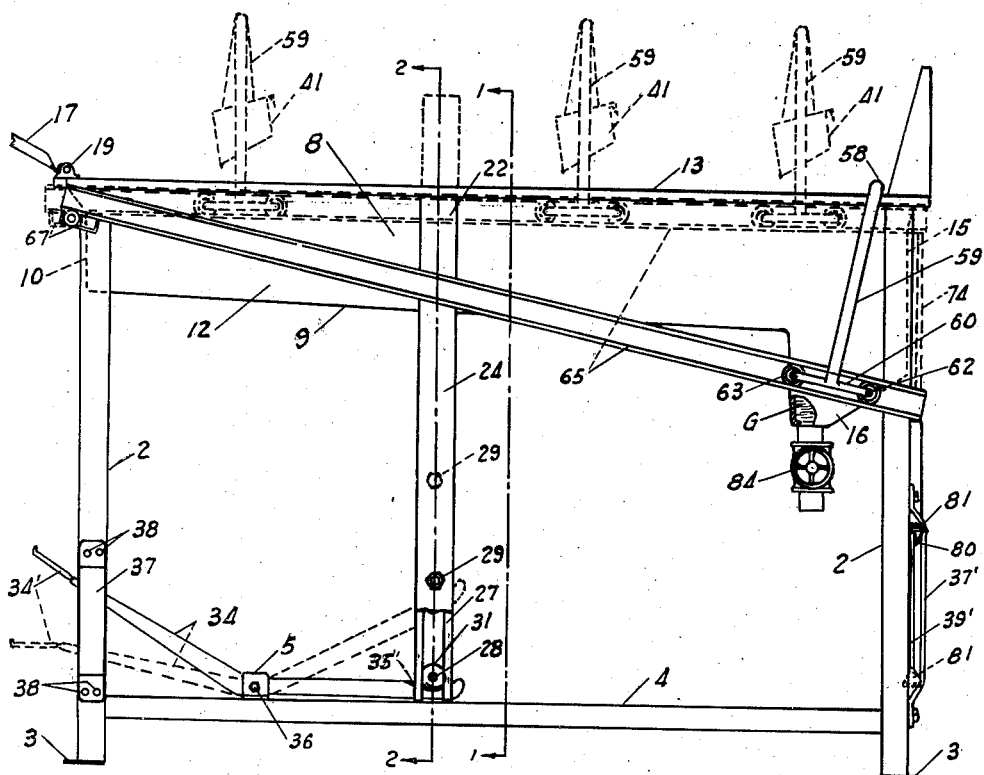
Figure 1 is a side elevation view of a pastry glazing machine embodying my invention.

Referring to the drawings, numeral 1 designates generally the frame of the illustrated glazing machine, and is made up of four posts 2 provided with post feet 3 and connected together near their bottom ends by bottom side runners 4 which are provided with pivot lugs 5, the purpose of which is to be explained later, and connected at the opposite ends by bottom end runners 6. A slanting lever brace 7, the purpose of which is to be explained later, is connected to one of the rear posts 2 and the rear bottom runner 6.

A tank 8 is mounted on the tops of the four posts 2. The tank 8 may be welded to the posts 2 or bolted thereto. The tank 8 has a bottom wall 9, a front wall 10 provided with a flange 11, and two side walls 12 provided with side wall flanges 13 through which slots 14 extend, the purpose of which will be explained later. The tank 8 is provided with a back wall 15 which is made considerably higher than the front wall 10 so that it will prevent the liquid glaze G in the bucket well 16 at the rear end of the tank 8 from splashing out of the tank 8. The front wall flange 11 and the side wall flanges 13 help prevent the glaze G from splashing out of the tank 8.

The tank 8 is provided with a lid 17 that is hinged to the tank 8 by means of pivot pins 19. The lid 17 is provided with a handle 18. The tank lid 17 is adapted to be folded in a forward extending position and supported by a tank lid prop 85 as best shown in Figure 9 of the drawings. In this position the lid 17 serves as a drain board to catch the glaze G drippings from doughnuts or other pastry laid out on a doughnut grid 21. While the surplus glaze G on one grid 21 covered with doughnuts or other pastry D previously glazed in the tank 8 is allowed to drip, a second grid 21 is lowered down into the glaze G on the doughnut grid lifters 22. In the lowered position the grid 21 rests on the grid supporting lugs 23 and lies just above the bottom wall 9 of the glazing tank 8.

A fence 20 is placed at the forward edge of the bucket well 16 to prevent doughnuts D, floating in the glaze G, from floating over the well 16 where they might interfere with the operation of the glaze bucket 41.

The doughnut grid lifters 22 are made in duplicate and each of them includes an upwardly extending run 24 that extends through a slot 14 in a side wall flange 13 and through which slot 14 it is adapted to move up and down. Each of the grid lifters 22 also includes a downwardly extending run 25 which extends down parallel to a side wall 12 of the tank 8 to points close to its bottom wall 9 where it terminates in the grid supporting lugs 23.

The grid lifters 22 are moved upwardly by means of the grid lifting columns 26 to which they are attached. They move downwardly under the force of gravity acting on them and the grid lifting columns 26 on which they are attached. The grid lifting columns 26 are made up of roller carriages 27 from which an upper stud roller axle 28 and a lower stud roller axle 29 are extended. An upper roller 30 is rotatably mounted on the upper stud axle 28 while a pair of rollers 31 are rotatably mounted on the lower stud axle 29 and spaced apart by a spacing collar 32 to so space the outermost bottom roller 31 as to be inside of the lifting column track 33 in position to be contacted by a lever cam 35'.

The right and left lower rollers 31 are moved by the grid lifting levers 34 joined together by the axle 36 the ends of which are rotatably mounted in the right and left pivot lugs 5. The cams 35' are designed to follow the bottom rollers 31 throughout their travel. The grid lifting lever 34 made as an extension of the left cam arm 35 moves both the right and left cam arms 35. The free end of the grid lifting lever 34 terminates in a foot pedal 34'. The grid lifting lever 34 is limited in its downward travel by a lever bracket 37 which embraces it. The lever bracket 37 is mounted on the front left post 2 of the frame 1 with bolts 38.

The surface of the lower end 40 of the lever stop 39 is made to slant in an upward and outward direction with respect to the post 2 on which the lever bracket 37 is mounted. Due to the slope of this lower edge 40 of the lever stop 39, the lever 34 is discouraged from slipping out from underneath the lever stop 39 under the force of merely slight jars of the lifting lever 34. To prevent the accidental lowering of the grid lifting lever 34 and the resultant dropping of an elevated pastry grid 21, the grid lifting lever 34 is sprung in a direction outwardly with respect to the post 2 to keep it under the lever stop 39.

When the operator wishes to lower a grid 21 under the surface of the glaze G in the tank 8, he kicks the foot pedal 34' of the grid lifting lever 34 from under the stop 39. Whereupon the force of gravity acting on the grid 21, the grid lifters 22 and the grid lifting columns 26 supporting them brings them to the downward position and throws the grid lifting lever 34 to its upward position.

The lever cams 35' of the grid lifting levers 34 strike the bottom side runners 4 of the frame 1 to limit the downward motion of the grid lifting levers 34.

Figure 2:
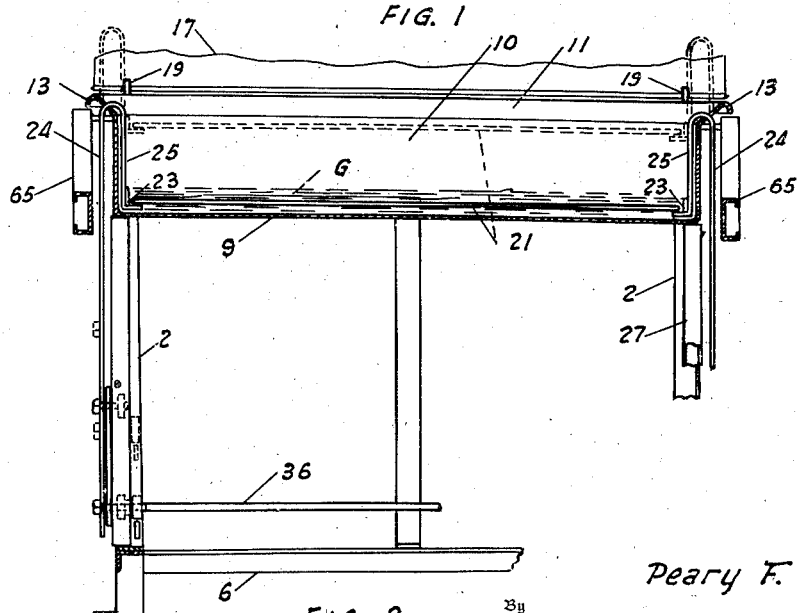
Figure 2 is a vertical cross sectional view of the machine illustrated in Figure 1 taken on line 1—1 of Figure 1.

When the grid 21 is submerged below the surface of the glaze G in the tank 8 as shown in Figure 2 and Figure 9 of the drawings, the pastry D is dumped into the glaze G and floats in it. The glaze G is applied to the top sides of the floating pastry D by means of the glaze bucket 41 which will now be described.

The glaze bucket 41 is made up of two end walls 42, a front wall 43 that terminates at its bottom in a lip portion 44, a back wall 45 provided with filling slots 46 and a back wall scraper 47 and the slanting bottom wall 49 that terminates at its lower edge in a lip 50. A valve rod guide brace 48 is extended crosswise of the top of the glaze bucket 41.

The spaced lip portions 44 and 50 of the front wall 43 and the bottom wall 49 respectively define the glaze discharge slot 51. The discharge slot 51 is closed by means of a valve 52 made in the shape of a rod. The valve 52 at its center is attached in a right angular relationship to the longitudinally adjustable rod 53 on the upper end of which there is a valve handle 54. The adjustable rod 53 slidably fits in a valve rod guide 56.

The valve 52 is urged downwardly to its valve closing position by means of a valve spring 55 interposed in between the lower end of the valve rod guide 56 and the valve 52 itself. The opening movement of the valve 52 is controlled by the position of the valve rod handle 54. The more the valve rod 53 is shortened, the greater will be the opening distance the valve rod handle 54 travels before striking the bucket handle 57, from which the glaze bucket 41 is suspended.

In the operation of my pastry glazing machine, the operator grips valve handle 54 and the glaze bucket handle 57 at the same time and with the same hand to discharge the glaze G from the glaze bucket 41 and to move the glaze bucket 41 over the pastry D floating in glaze in the tank 8, as best shown in Figure 9 of the drawings.

The operator may, when he desires to do so, release the valve rod handle 54 to shut off the flow of glaze G at any place in the travel of the glaze bucket 41 over the floating pastry D.

The entire glaze bucket 41 is supported by the glaze bucket handle 57 which handle is made up of the crosswise extending portion 58 which is grasped by the operator and right and left uprights 59 on the lower ends of which are attached bucket handle feet 60. The bucket handle feet 60 extend at right angles to the uprights 59. The bucket handle feet 60 are made up of roller carriages 61 that carry roller pins 62 and on which a pair of rollers 63 are mounted and secured by nuts 64.

The bucket handle feet 60 roll in the bucket handle foot tracks 65 of which there are a pair. They are joined together at the back end of this pastry glazing machine behind the rear wall 15 by a spacing rod 66. Each of the bucket handle foot tracks 65 is provided with a depending bracket 67 at its rear end to allow for a forward and rearward movement of the foot track 65 that the foot track 65 must travel in addition to the turning motion about the foot track pivot bolt 68 extending through the bracket 67.

The foot tracks 65 must slide over the pivot bolts 68 for the reason that the spacing rod 66 connecting the back ends of the foot tracks 65 is constrained to move only in a vertical direction, up or down, as it is moved by the bucket lifter 74, on which it rests, to be described later.

The pivot bolts 68 are mounted on the forward posts 2 of the frame 1 by means of spaced nuts 69 that are threaded onto the threaded portion 70 of a pivot bolt 68 and then welded to the rear post 2 in their spaced positions. Lock nuts 71 are employed to prevent the pivot bolts 68 from becoming accidentally loosened.

Spacing washers 72 are placed on opposite sides of the depending brackets 67, one underneath the bolt head 73 to prevent the foot tracks 65 from slipping over the bolt head 73 and the other between the depending bracket 67 and the post 2 to properly space the bracket 67 away from the post 2 to prevent it from rubbing on the post 2.

The bucket lifter 74 which I will describe now is very similar to the previously described doughnut grid lifter 22 and operates in a similar manner. The bucket lifter 74 is made up of a roller carriage 75 from which spaced roller pins 76 are extended in right angular directions. The upper roller pin 76 carries an upper roller 77 while the lower roller pin 76 carries a pair of lower rollers 78. One of the lower rollers 78 is positioned outside of the roller carriage track 79 in a position to be contacted by the cam 82 of the lifting lever 80. The lifting lever 80 is pivotably mounted on the lever support brace 7. The lifting lever 80 terminates in a foot pedal 81 which extends beyond the left rear post 2 of the frame 1.

The reader will more clearly understand the above described mechanisms which make up my pastry glazing machine from the following brief description of its operation.

In operating my pastry glazing machine, an operator stands on the left side with his right hand in position to grasp and move the glaze bucket 41 after he has raised it to its horizontal traveling position by pressing down on the right foot pedal 81 of the bucket lifting lever 80. When he raises the glaze bucket 41 to its upright position by the lifting lever 80, he pushes it under the lever stop 83, since in this lifting lever 80 construction a small amount of play is allowed to permit the lever 80 to be moved in and out from under the lever stop 83. The next thing the operator does is to grasp the handle 57 of the glaze bucket 41 and also the valve rod handle 54 at the same time. He then moves the glaze bucket 41 while the glaze G is pouring out on the upper surface of the floating pastry D.

The operator passes the glaze bucket 41 while it is discharging glaze G over the pastry D first to the left and then returns it in a reverse trip back to its position of rest above the bucket well 16. With his left foot he now bears down on the doughnut grid lifting lever pedal 34' to bring the grid lifters 22 to their raised position to bring up a grid 21 full of pastry D now completely glazed on all sides.

The operator now lifts the grid 21 holding the glazed pastry D from off the elevated grid supporting lugs 23 and sets it aside on the tank lid 17 where the surplus glaze G is allowed to drain off and run down into the glazing tank 8. After this the operator places an empty grid 21 on the supporting lugs 23 after which they are lowered down into the glaze G. With his right foot he again lowers the glaze bucket 41 down into the bucket well 16 where it fills up with glaze G that pours into it through filling slots 46 in its back wall 45.

By the time the operator is ready to operate the glaze bucket 41 over a new batch of pastry D, the grid 21 placed on the lid 17 may be removed to some other place such as the rack R shown in Figure 9. The reader will see now that a continuous glazing operation may be performed by the operator when using my pastry glazing machine.

From time to time when the glaze G becomes clouded with pastry crumbs, it may be withdrawn from the tank 8 through the drain valve 84.

The details of the manufacture of my glazing machine are not gone into in this specification since its manufacture lies within the expected knowledge of those skilled in the metal arts such as the boiler makers' arts and tinsmiths' arts.

Having thus described my invention, I claim:

1. A pastry glazing machine comprising a tank adapted to hold liquid glaze, a glaze distributing means including a glaze bucket and a distributing valve adapted to discharge glaze from said bucket, said glaze distributing means being movably mounted on a track whereby said glaze distributing means may be moved across said tank, said track being pivotably mounted for vertical movement with respect to said tank, whereby said glaze bucket may be dipped into glaze in said tank.

2. A pastry glazing machine comprising a tank adapted to hold liquid glaze, a glaze distributing means including a glaze bucket and a distributing valve adapted to discharge glaze from said bucket, said glaze distributing means being movably mounted on a track whereby said glaze distributing means may be moved across said tank, said track being pivotably mounted for vertical movement with respect to said tank, whereby said glaze bucket may be dipped into glaze in said tank and a means for raising and lowering said track.

3. A pastry glazing machine comprising a tank adapted to hold liquid glaze, a glaze distributing means including a glaze bucket and a distributing valve adapted to discharge glaze from said bucket, said glaze distributing means being movably mounted on a track whereby said glaze distributing means may be moved across said tank, said track being pivotably mounted for vertical movement with respect to said tank, whereby said glaze bucket may be dipped into glaze in said tank, a means for raising and lowering said track, a pastry grid and a means for lowering and raising said pastry grid down and up in said tank.

4. A pastry glazing machine comprising a frame, a tank adapted to hold liquid glaze mounted on said frame, a glaze distributing means mounted on said frame, said glaze distributing means including a pair of parallel spaced tracks pivotably mounted on said frame for vertical movement with respect to said tank and a glaze bucket movably mounted on said tracks adapted to move in said tracks across said tank, said tank including a well portion and a means for raising and lowering said tracks, whereby said glaze bucket may be moved in said tracks over said well portion and lowered into said well portion.

5. A pastry glazing machine comprising a frame, a tank including a well portion adapted to hold liquid glaze mounted on said frame, a glaze distributing means mounted on said frame, said glaze distributing means including a pair of parallel spaced tracks pivotably mounted on said frame for vertical movement with respect to said tank and a glaze bucket movably mounted on said tracks adapted to move in said tracks across said tank in a direction to move over said well portion, a means for raising and lowering said tracks whereby said glaze bucket may be moved into and out of said well portion, a pastry grid and a means for raising and lowering said pastry grid in said tank.

6. A pastry glazing machine comprising a frame, a rectangular tank provided with a well portion located at one of its ends adapted to hold liquid glaze, said tank being mounted on said frame, a glaze distributing means mounted on said frame, said glaze distributing means including a pair of parallel spaced tracks extending substantially the full length of said tank, pivotably mounted on said frame adjacent to the end of said tank opposite to the end at which said well is located for vertical movement with respect to said tank, a glaze bucket movably mounted in said tracks in a manner to move lengthwise across said tank and a means for raising and lowering said tracks adapted to move said glaze bucket into and out of said well portion.

7. A pastry glazing machine comprising a frame, a rectangular tank provided with a well portion located at one of its ends adapted to hold liquid glaze, said tanks being mounted on said frame, a glaze distributing means mounted on said frame, said glaze distributing means including a pair of parallel spaced tracks extending substantially the full length of said tank, said tracks being pivotably mounted on said frame adjacent to the end of said tank opposite the end at which said well portion is located for vertical movement with respect to said tank, a glaze bucket movably mounted in said tracks in a manner to move lengthwise across said tank, a means for raising and lowering said tracks adapted to move said glaze bucket into and out of said well portion, a pastry grid and a means for raising and lowering said pastry grid down and up in said tank.

8. The device as claimed in claim 6 wherein said tracks are mounted on opposite sides of said tank and wherein said glaze bucket is suspended from a bucket handle extending crosswise of and above said tank and wherein said glaze distributing means is provided with a glaze control valve and wherein said glaze control valve is provided with an operating handle located adjacent to said bucket handle in position to be grasped and moved by the same hand an operator uses in grasping said bucket handle.

9. The device as claimed in claim 5 wherein said means for raising and lowering said tracks includes a releasable locking means adapted to hold said tracks in an elevated position.

10. The device as claimed in claim 5 wherein said means for raising and lowering said tracks is provided with a releasable locking means adapted to hold said tracks in an elevated position and wherein said means for lowering and raising said pastry grid is provided with a releasable locking means adapted to hold said pastry grid in an elevated position.

PEARY F. RATCLIFF.

REFERENCES CITED

The following references are of record in the file of this patent:

UNITED STATES PATENTS

| Number | Name | Date |
| --- | --- | --- |
| 1,967,856 | Beckman | July 24, 1934 |
| 1,413,995 | Salerno | Apr. 25, 1922 |